(12) United States Patent
Ghosh et al.

(10) Patent No.: US 11,245,540 B2
(45) Date of Patent: Feb. 8, 2022

(54) OVER THE TOP NETWORK TRAFFIC CLASSIFICATION

(71) Applicant: T-MOBILE USA, INC., Bellevue, WA (US)

(72) Inventors: Arundhati Ghosh, Bellevue, WA (US); Piradee Nganrungruang, Bellevue, WA (US); Kelly Schiller, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/898,032

(22) Filed: Jun. 10, 2020

(65) Prior Publication Data

US 2021/0392007 A1 Dec. 16, 2021

(51) Int. Cl.
*H04L 12/14* (2006.01)
*H04L 29/12* (2006.01)
*H04L 29/08* (2006.01)

(52) U.S. Cl.
CPC ...... *H04L 12/1442* (2013.01); *H04L 61/2542* (2013.01); *H04L 61/6086* (2013.01); *H04L 67/104* (2013.01)

(58) Field of Classification Search
CPC .............. H04L 12/1442; H04L 61/2542; H04L 61/6086; H04L 67/104
See application file for complete search history.

(56) References Cited

U.S. PATENT DOCUMENTS

| 10,115,124 B1* | 10/2018 | Kamvysselis | ...... G06Q 30/0242 |
| 10,929,378 B1* | 2/2021 | Bigman | .................. H04L 43/00 |
| 2006/0029081 A1* | 2/2006 | Yan | .................... H04L 29/12009 370/395.52 |
| 2010/0142514 A1* | 6/2010 | Stein | ....................... H04L 12/66 370/352 |

\* cited by examiner

*Primary Examiner* — Philip C Lee
(74) *Attorney, Agent, or Firm* — Marshall, Gerstein & Borun LLP

(57) ABSTRACT

A system and method is disclosed to transform Over-The-Top (OTT) call log data collected by telecommunications network operators into a peer-to-peer log in order to determine more accurate information. In this method the IP addresses in the call log records are compared to a list of known mediator server IP addresses and the records in the log that contain mediator server IP addresses are removed from the log to create a peer-to-peer log containing only those records that contain peer IP addresses. The data in the peer-to-peer log can then be categorized with confidence to determine network performance information as well as, for example, the percentage of traffic to a particular country. Conclusions may then be inferred regarding the removed data records based upon the data found in the peer-to-peer log.

20 Claims, 5 Drawing Sheets

FIG. 4A — 400

| Originator | Timestamp | Duration (secs) | Ip_dest_addr | Protocol |
|---|---|---|---|---|
| 14752982305 | 05May23:01:54 | 11 | 2607:7700:0:1E:0:1:ADE1:F3C2 | whatsapp |
| 17866307107 | 05May23:01:56 | 51 | 2607:7700:0:1E:0:1:CDCD:4938: | skype |
| 17863806996 | 05May23:01:57 | 65 | 2607:7700:0:1E:0:1:BEB6:7699 | whatsapp |
| 13477929143 | 05May23:01:58 | 180 | 2607:7700:0:1E:0:1:63E1:56C5 | whatsapp |

402 — Originator; 404 — Timestamp; 406 — Duration; 408 — Ip_dest_addr; 410 — Protocol; 412

FIG. 4B — 420

| Known TURN servers |
|---|
| 2607:7700:0:1e:0:1:ade1:f3c0 |
| 2607:7700:0:1e:0:1:ade1:f3c2 |
| 2607:7700:0:1e:0:1:ade1:f3c4 |

| MSISDN | Timestamp | Duration (secs) | Ip_dest_addr | Protocol |
|---|---|---|---|---|
| 17866307107 | 05May23:01:56 | 51 | 2607:7700:0:1E:0:1:CDCD:4938: | skype |
| 17863806996 | 05May23:01:57 | 65 | 2607:7700:0:1E:0:1:BEB6:7699 | whatsapp |
| 13477929143 | 05May23:01:58 | 180 | 2607:7700:0:1E:0:1:63E1:56C5 | whatsapp |

OVER THE TOP NETWORK TRAFFIC CLASSIFICATION

FIELD OF THE DISCLOSURE

The present disclosure relates to Over-The-Top (OTT) Internet Protocol (IP) voice, video and message applications which transmit data using network equipment of a telecommunications network operator.

BACKGROUND

Over-The-Top (OTT) messaging and voice applications, such as Facebook Messenger®, Line®, Skype®, Telegram®, Viber®, WhatsApp®, Zoom Video® and other OTT Applications carry a significant portion of voice calls, video calls, text messages, and multimedia messages. More than 126 million U.S. mobile phone users access Facebook Messenger to communicate and, in addition, the WhatsApp subsidiary of Facebook has more than 68 million customers, many of which are also using mobile telecommunications network operators for data transmission. The details of this traffic are often opaque to the telecommunications network operator. The telecommunication network operator, however, requires detailed performance and throughput information in order to economically route and ensure quality of service for the data traffic traversing its network. In addition, the telecommunication network operator sometimes has a government obligation to intercept or block certain messaging data either from certain applications or to or from certain countries. In order to maintain a high performance telecommunication network, to comply with certain government orders, as well as make it easier to create new offers or business initiatives to users of these applications, it is important to mobile telecommunication network operators to monitor and correctly classify this data.

Of special interest to the telecommunication network operator is the large volume of messaging and Voice over Internet Protocol (VoIP) traffic to countries outside the U.S. Currently no key performance indicators (KPI's) reliably and accurately measure the call or messaging volume or performance for these international OTT applications. The telecommunications network operator desires general call and messaging key performance indicators from the OTT data traversing their network. More information is desired for marketing purposes, to comply with government orders which may require operators to block a certain application or block the encrypted traffic to a particular destination, and for radio and network performance planning purposes. Currently, the telecommunications network operator does not know the true destination or origination country of much of this traffic. For example, even with use of an Internet Protocol (IP) data sniffer, the IP address of an Irish-based Facebook server appears as the destination IP address for much of the traffic destined for multiple European countries. The exact destination country may affect the routing and the cost of transporting international data. What is needed is a better way for telecommunication network operators to monitor the OTT data in order to maintain a high performance telecommunication network, as well as to create new marketing initiatives and optimize the data routing for themselves as well as the users of OTT applications.

SUMMARY

The innovation described herein examines IP voice, video and message logs to better identify and classify the Over-The-Top (OTT) IP applications. The data are recorded in the log at the telecommunications network operator and the log is transformed by this method into a higher quality peer-to-peer log.

The IP address in the log either may be the IP address of the originating or receiving client or, depending on the method used, the IP address of an intermediate server. Typically, OTT applications use one protocol to setup an OTT call, and a different protocol to transmit the voice or message payload. To traverse the Network Address Translation (NAT), a Session Traversal of User Datagram Protocol through Network Address Translators (STUN) server is often used to return the address of the destination client device. However, this method is not always successful. A Traversal Using Relays around NAT (TURN) server (also referred to herein as a mediator server) is typically used as a backup for the STUN, as it is more reliable than STUN, but unfortunately also more resource intensive than STUN servers. The TURN server also does not return the address of the destination client, but its own address. When a STUN server is selected, the originating client receives its own public IP address from the STUN server as well as the public IP address of the destination client, allowing a subsequent peer-to-peer transaction to occur. This also allows the originating network to derive other information, such as determining the destination country from the destination IP address. When a TURN server is selected for use, however, the originating client does not have visibility to the destination IP address but rather receives the IP address of the TURN server as the destination IP address, which gives misleading or incomplete information about the recipient and the destination.

The present application discloses systems, methods, and computer-readable media storing instructions which cause one or more processors to identify and classify data traffic in a telecommunications network. Such systems, methods, or computer-readable instructions may include techniques to identify and classify peer-to-peer IP communication over a telecommunications network by: obtaining a log containing records of IP communications exchanges involving a plurality of users of the telecommunications network; identifying IP addresses associated with the records in the log; converting the identified IP addresses to peer public IP addresses for the records in the log; obtaining a list of known mediator server IP addresses; removing a subset of the records that include the known mediator server IP addresses from the log to generate a peer-to-peer IP communication log; and grouping the records in the peer-to-peer IP communication log by similar characteristics.

In various embodiments, additional, fewer or alternate actions may be included or performed by the systems, devices, methods, and computer-readable media, including those discussed elsewhere herein.

BRIEF DESCRIPTION OF THE DRAWINGS

The figures described below depict various aspects of the applications, methods, and systems disclosed herein. Each figure depicts an embodiment of a particular aspect of the disclosed applications, systems and methods, and that each of the figures is intended to accord with one or more possible embodiments thereof. Furthermore, wherever possible, the following description refers to the reference numerals included in the following figures, in which features depicted in multiple figures are designated with consistent reference numerals.

FIG. 4A illustrates a portion of an IP message log.

FIG. 4B illustrates a sample list of known mediator server IP addresses.

FIG. 4C illustrates a sample peer-to-peer IP communication log which is derived from the IP message log.

DETAILED DESCRIPTION

Figure 1:
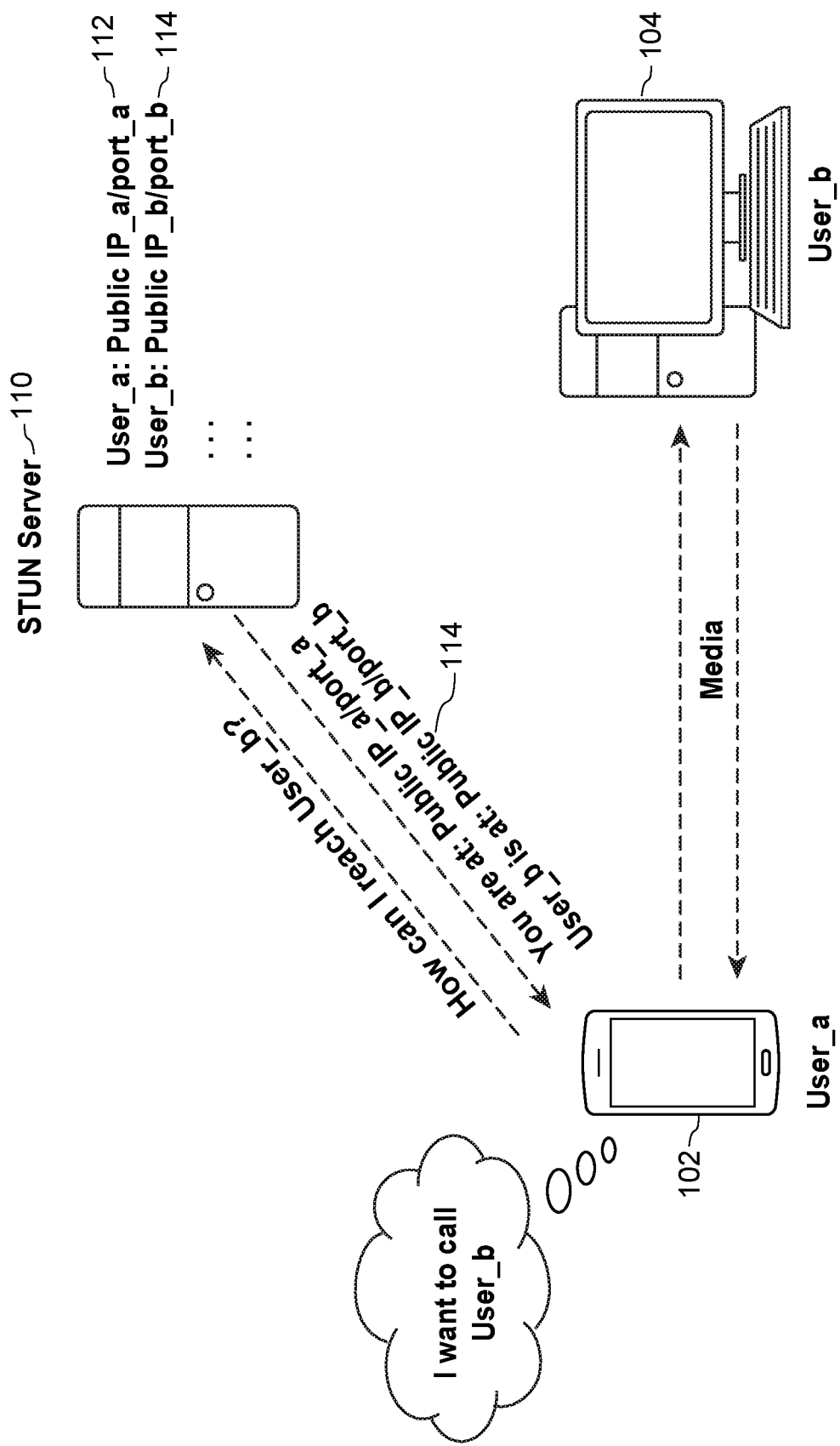
FIG. 1 illustrates a block diagram showing prior art of call setup of an OTT call using a Session Traversal of User Datagram Protocol through Network Address Translators (STUN) server which allows clients to setup phone calls to a Voice over IP (Vol P) provider hosted outside of the local network.

Over-The-Top (OTT) data can be classified in a more accurate manner by the systems and methods described herein. The users of OTT application clients often transmit data to one or more other users via the internet using a 4G or 5G wireless telecommunication network or by use of 802.11 Wi-Fi connected to a multimedia cable network, both of which are referred to herein as telecommunications networks. Such embodiments typically use Network Address Translation (NAT) for establishing OTT communication connections. Therefore, the OTT application client must use one or a combination of several options to navigate the NAT. In some cases an intermediary "mediator" server, such as a Traversal Using Relays around NAT (TURN) server, is used to bypass the NAT and gain access to users on another network. When mediator servers are used, neither the user application nor the telecommunications network operator may know the public IP addresses of the destination of the messages or calls originating or terminating on many remote telecommunications networks, or the true originator of some calls originating on a remote network. As the data traffic on their network grows without knowing the true destination or origination of some of this traffic, the telecommunications network operator is at a disadvantage in planning for its physical and logical network, a disadvantage in negotiating with third-party routing companies, and at a disadvantage in responding to any government mandate regarding the OTT data.

An exemplary method of the invention described herein transforms a log of network communications into a higher quality peer-to-peer log. The exemplary method includes obtaining a log of OTT data traffic records, identifying the origination or destination IP addresses of the traffic in each record, obtaining a list of know mediator server IP addresses, converting the IP addresses in the data records so that they are in the same format as known mediator servers obtaining a list of publicly known mediator servers, keeping a count and then removing the records from the log containing IP address of the publicly known mediator servers, creating a peer-to-peer log using the remaining records, and grouping the remaining records in the peer-to-peer public IP addresses into various categories by similar characteristics found in the remaining data records. A telecommunications network operator implementing such exemplary method may then choose to extrapolate or draw other conclusions from the known good records to the data records that have been removed. For example, the telecommunications network operator may choose to assume that the removed records have the same distribution as the known good records, or, if they have noted the application type of the removed records, may assume that the removed records have the same distribution as a more transparent similar application that does not use mediator servers. For example, an international VoIP application that uses a mediator server may be assumed to have the same distribution of countries as a similar VoIP application that does not use a mediator server.

When IP addresses from the log are selected, different methods such as IPv4 mapping may be used to normalize the IP addresses of the destination IP addresses for comparison to the publicly known mediator server IP addresses. After records containing all known mediator IP server addresses are removed and the peer-to-peer IP transaction log is created, different classifications can then be made about the data, such as the number of messages to a particular user, particular country, total number of calls per application, and total number of calls or messages destined to a particular country in a given time period.

Figure 2:
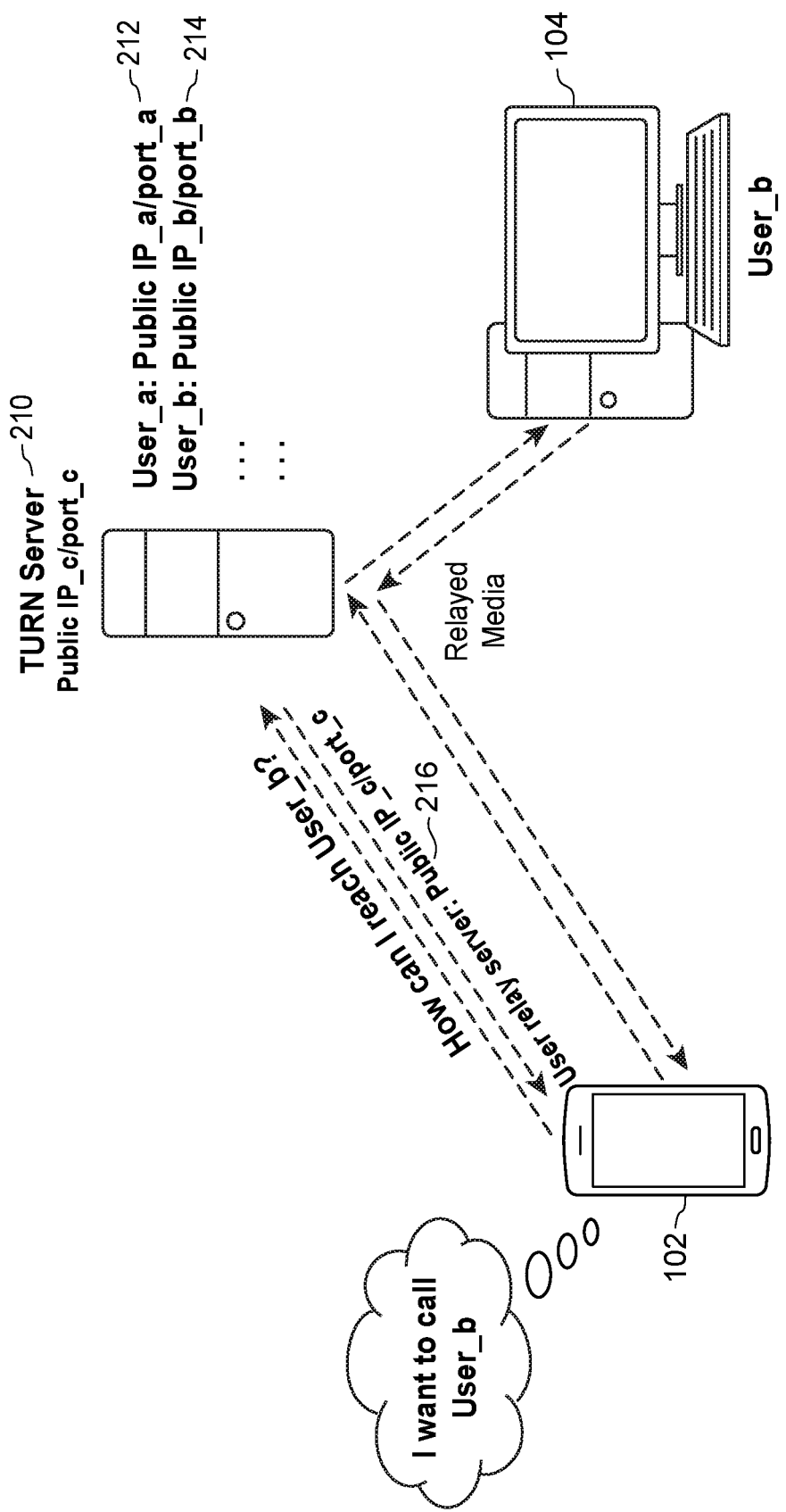
FIG. 2 illustrates a block diagram showing prior art of call setup of an OTT call using a mediator (TURN) server which performs a similar service as the STUN server, but returns less useful information to the originator and the originator's network.

FIGS. 1 and 2 illustrate exemplary techniques existing in the prior art for establishing communication sessions (e.g., voice over IP calls, video calls, or messages) between users of an OTT application. The exemplary technique illustrated in FIG. 1 establishes such connection directly between the users, while the exemplary technique illustrated in FIG. 2 establishes such connection via an intermediary mediator server configured to relay communication between the users. In many instances an Interactive Connectivity Establishment (ICE) protocol is used by OTT applications to coordinate STUN and TURN servers to optimize call setup of peer to peer applications and route the setup through either a STUN or a TURN server to successfully traverse the NATs used in the call or message exchange. As discussed elsewhere herein, though either type of server may be used by the same application at different times, it is necessary to distinguish between these direct and intermediated connection techniques because the intermediated connection technique using a mediator server prevents detection of information regarding users outside the network of a telecommunications network operator.

FIG. 1 illustrates a block diagram showing user computing devices associated with User_A 102 and User_B 104 setting up a conversation using a STUN server 110. The STUN Server 110 receives a request from the User_A 102 and returns both the public IP address 112 for User_A 102 and the public IP address 114 for User_B 104. User_A 102 can then use public IP address 114 for User_B 104 to connect to User_B 104 directly. Communication between User_A 102 and User_B 104 then proceeds directly between the user devices associated with their public IP addresses via one or more telecommunications networks (not shown) This also allows the telecommunications network operator to accurately derive the destination country from the IP address as well as increment the number of calls and the talk-time into that country.

FIG. 2 illustrates a block diagram showing the user computing devices associated with User_A 102 and User_B 104 setting up a conversation using a TURN Server 210. In this case, the TURN Server 210 returns to User_A 102 the IP Address 212 of User_A 102 as well as IP Address 216 for TURN Server 210. In this call setup, User_A 102 is provided IP Address 216 for TURN Server 210. User_A 102 routes all subsequent traffic through TURN Server 210, which subsequently relays such traffic to User_B 104. The TURN Server 210 also relays traffic from User_B 104 to User_A 102, such that the communications traffic is routed through the TURN server 210. This does not allow either User_A 102 or the telecommunications network operator of a telecommunications network being used by User_A 102 to identify the public IP Address 214 of User_B 104. Such intermediation thus precludes, among other things, knowing the destination country for communications to User_B 104.

Figure 3:
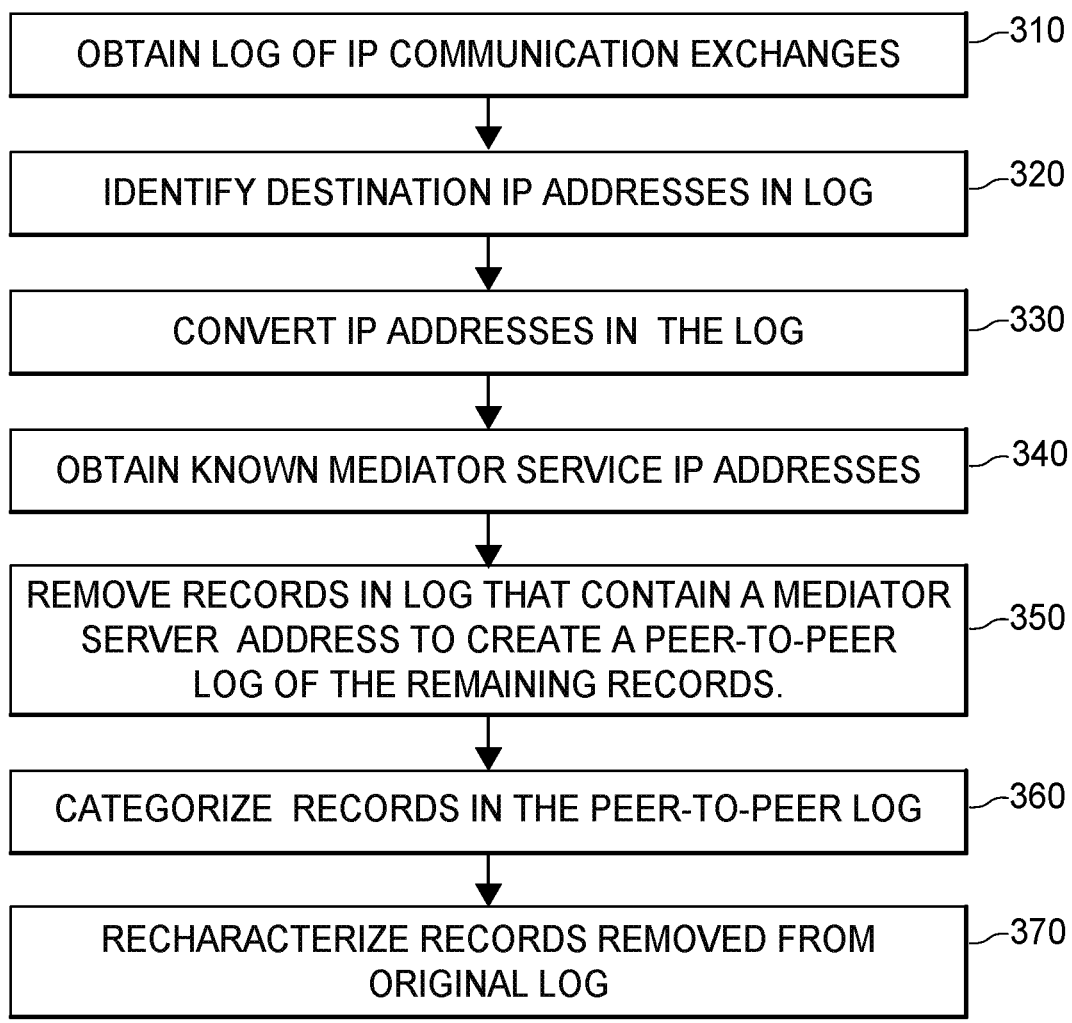
FIG. 3 illustrates a flow diagram of an exemplary OTT detection method to detect and classify OTT Traffic.

FIG. 3 illustrates a flow diagram of an exemplary OTT method 300 to detect and classify OTT Traffic over a telecommunications network. The OTT method may be implemented periodically or upon occurrence of an event (e.g., receipt of a user-indicated request to categorize specified network traffic) by a telecommunications network operator server 550 associated with a telecommunications network operator, as described below. Specifically, a processor 544 of the telecommunications network operator server 550 may execute computer-readable instructions stored in a memory 542 of the telecommunications network operator server 550. Additional, fewer, or alternative aspects may be implemented in various embodiments.

Initially the telecommunications network operator obtains a log of network data traffic over a telecommunications network as shown in Block 310. This log of traffic on the telecommunications network may be located on a network server, such as in a Gateway GPRS (General Packet Radio Service) Support Node (GGSN), Serving GPRS Support Node (SGSN) or in another network server such as in a billing server. In one embodiment, the log is automatically generated in a particular time interval such as on an hourly or daily basis, or after a certain number of records are collected for the log. Typically, this log will contain date and time stamps for each record, a duration of the call or video, as well as a unique identifier for the source of the data and an identifier, such as an IP address, for the destination of the data. The log may optionally contain an indicator of a particular OTT application that was detected as being associated with a particular record (i.e., with a particular communication exchange). The particular OTT applications in the data stream can be identified by one or more protocols in use, such as the proprietary WhatsApp protocol, or Zoom Video protocol. Other OTT applications use SIP or H.323 for call setup, which often have a distinct signature in the header data even when the contents of the message are encrypted. Those of skill in the art will understand that in a record of a communication originating in the telecommunications network, the unique identifier of the source of the data may include a Mobile Station International Subscriber Directory Number (MSISDN), an International Mobile Subscriber Identity (IMSI), an Integrated Services Digital Network (ISDN), an International Mobile Equipment Identity (IMEI), Mobile Equipment Identifier (ME D) or a static IP address associated with and unique to the originator. The message log also contains a destination IP which may or may not be the final destination of the data depending on the NAT traversal method used.

The IP addresses in the log are then identified as shown in Block 320. These IP addresses are typically transmitted in a readable form by the OTT applications in order to enable the networks to route the communications to such addresses. Identifying the IP addresses in the log may include identifying a corresponding field or column associated with such IP addresses, or it may include searching records in the log to detect data formatted in a manner indicating such data corresponds to an IP address. The IP addresses may include IPv4 addresses, which may need to be converted to an IPv6 address by a number of different methods. Alternately, the addresses may include IPv6 addresses that may be converted to IPv4. Thus, in some embodiments, one or more of the IP addresses in the log may be converted to peer public IP addresses, as is indicated in Block 330. This conversion enables an easier comparison between the destination IP address and a known list of mediator server IP addresses. One technique used in IPv4 to IPv6 mapping is to use a hybrid address consisting of 80 "0" bits, followed by 16 "1" bits ("FFFF" in hexadecimal), followed by the original 32-bit IPv4 address to create a routable IPv6 address. This method requires the use of a small subset of the IPv6 space which may or may not be possible in all cases. Alternatively, Teredo servers, IPv6 tunnel methods, or IPv6 utilities such as Automatic IPv6 Connectivity Client Utilities (AICCU) may be necessary for the conversion between IPv4 and IPv6.

In Block 340, a list of IP addresses associated with known mediator servers (e.g., TURN servers) is obtained. These may be obtained from free internet sites or from a paid service. In some embodiments, obtaining the list of known mediator server IP addresses may include accessing a list of IP addresses previously identified by the telecommunications network operator as being associated with mediator servers of OTT applications. Such list may have been generated by the telecommunications network operator based upon the level or type of OTT data received by or sent from such IP addresses.

In Block 350, the list of mediator server IP addresses is compared to the destination IP addresses of the records in the message log, and records containing any of the IP addresses associated with the mediator servers are removed. Thus, a more accurate peer-to-peer log of the remaining OTT records is generated. Outbound OTT records in the log that contain destination IP addresses matching known TURN servers are counted and then removed from the message log to create a clean peer-to-peer log that contains records with only peer-to-peer IP addresses. Inbound OTT Records that contain origination IP addresses matching known TURN servers are also removed from the message log. As a result, the original log is transformed into a higher quality peer-to-peer IP communication log which does not contain mediator server addresses.

The peer-to-peer IP communication log can then be categorized with confidence in Block 360, knowing that the IP addresses in the record data represent true peer clients (rather than mediator servers). The data can then grouped in Block 360 by a plurality of criteria, including by destination country, by origination country, by United States or foreign destination, by United States or foreign origination, by particular OTT application, by counts of messages transmitted in a particular period of time, by type of message transmitted (video, chat, or multimedia message), by Busy Hour Call Attempts (BHCA), by call duration or minutes of use, or grouped by messages to or from a particular destination IP address or to or from a particular sender device. For example, once the log is transformed to a peer-to peer log, software utilities such as IPWHOIS or iplocation.net can be used to determine the destination country given the peer destination IP address.

In some embodiments, the method 300 may further include recharacterizing the records removed from the original log (i.e., the records associated with IP addresses of known mediator servers), as shown in Block 370. The recharacterization of the removed record data may include extrapolation of the known peer-to-peer data log to categorize the data records that have been removed. For example if 20% of the records are removed due to use of a TURN mediator server, and the remaining 80% of the records in the peer-to-peer log contain records that are evenly split between IP addresses terminating in countries A, B, C and D, the network operator may want to extrapolate that 25% of all the records, including the removed records go to each of the countries A. B, C and D. Alternately, if the telecommunications network operator carries data for one particular application X that is much more likely than its direct competitor to use a TURN server and those records from application X that contain mediator server addresses are removed, the telecommunications network operator may wish to replace the distribution of the removed mediator records of that application X with a distribution estimate based upon the peer-to-peer data of the direct competitor Y which has data that is more visible to the operator.

The peer-to-peer data (together with any recharacterized removed records) may then be used by the telecommunications network operator to optimize the network traffic physical layer (e.g., by upgrading to OC-3 or OC-48 connectivity for a large volume of data to a particular geographical area or merely using T1/E1 connectivity for a smaller volume of data). If data is routed through a third-party service, the categories determined from the peer-to-peer log may also be used to optimize costs. Typically, third-party routing companies have varying costs depending on the destination country and the amount of data. A volume discount on a per-destination country basis may be negotiated if the volume of the IP data and volume of peak traffic to a particular country can be reliably measured.

In an embodiment that includes inbound OTT traffic, the source address found in the log 400 may potentially be an IP address of a mediator server, and the method may be similarly applied to traffic inbound to determine source countries or other information from the inbound OTT data by the telecommunication network operator network.

FIG. 4A illustrates a portion of an exemplary IP message log 400 containing records of IP communications exchanges. In this log, the originator identifier 402 associated with the sender device is a unique MSISDN identifier but may also be an ISDN, IMSI, IMEI, MEID or static IP address that uniquely identifies the sender. The log 400 also may include a date and time stamp 404 and duration 406 of each message, video or call, as well as a destination IP address 408 (which may be the IP address of an intermediate mediator server device or may be an IP address of the true peer recipient of the data). The log may also include a protocol type field 410 that may be determined by recognizing one or more header fields, which may, for example, recognize the derivative of XMPP in use by WhatsApp or an H.323 format used in video conferencing. This exemplary log 400 contains the destination IPv6 address 2607:7700:0:1E:0:1:ADE1:F3C2 as shown in the record labeled 412 of FIG. 4A.

FIG. 4B illustrates a sample list 420 of known mediator server IP addresses, which may be obtained from online shared lists or a paid service. Note that this log also includes IPv6 address 2607:7700:0:1E:0:1:ADE1:F3C2 in the entry labeled as 422. This IP address is the same address as found in record 412 in the message log of FIG. 4A, therefore indicating that the record 412 is a record of communication via an OTT application through a TURN server.

FIG. 4C illustrates an example peer-to-peer IP communication log 440 based upon the IP message log 400, with the record 412 associated with the TURN server IP address removed. Such peer-to-peer IP communication log 440 contains data regarding communication between peer devices using OTT applications, without including records of communication between a peer device and a TURN server. Thus, the peer-to-peer IP communication log 440 provides an accurate list of OTT application communications, which may be further used to determining characteristics regarding OTT application communications on the telecommunications network. Although the peer-to-peer IP communication log 440 provides only a partial list of all OTT application communications, it improves the accuracy of the information contained therein regarding the type, locations, networks, or other characteristics associated with the records (i.e., by avoiding the skewing effects of communication with TURN servers).

Figure 5:
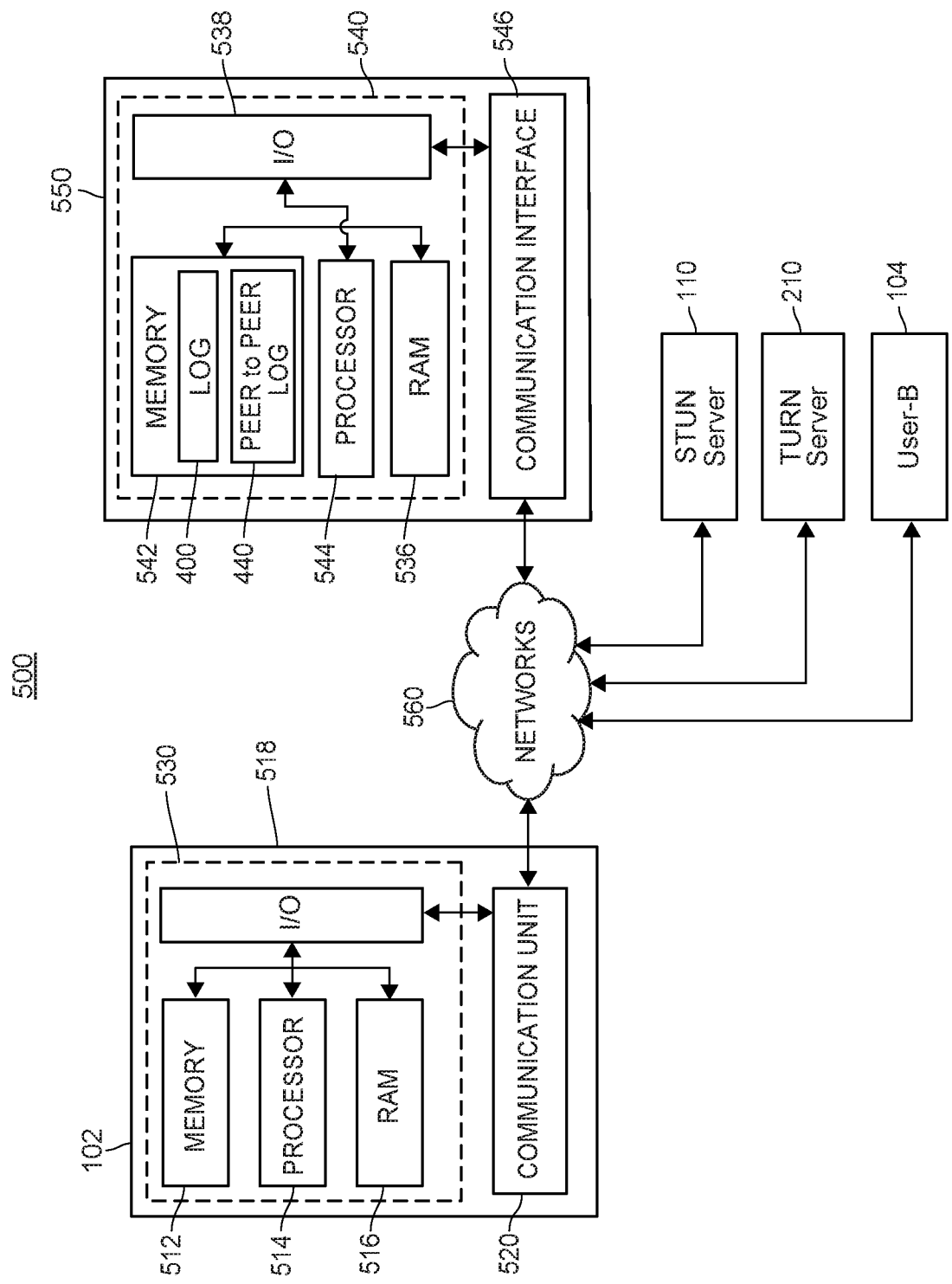
FIG. 5 illustrates a system including a network server device which contains the computer-readable media stored in memory.

FIG. 5 illustrates a telecommunications system 500 associated with a telecommunications network operator. The system includes more details of a telecommunications network operator server 550, as well as more detail of the user computing devices associated with User_A 102 and User_B 104, a STUN server 110 and a TURN server 210. The user computing device associated with User_A 102 includes a controller 530 which includes a memory 512, a processor 514, a Random Access Memory (RAM) 516 and an Input/output interface 518. The I/O interface 518 may might use a radio interface in the Communication Unit 520 to access the user computing device associated with User_B 104 via, for example, the 5G radio access network of the telecommunications network operator or Wi-Fi connectivity to the core network of the telecommunications network operator which may connect to the internet. The user computing device associated with User_A 102 may consult the STUN server 110 before contacting the user computing device associated with User_B 104. Alternately, the user computing device associated with User_A 102 merely contacts the TURN server 210 which contacts the user computing device associated with User_B 104.

In either case, the user computing device associated with User_A 102 also communicates with the telecommunications network operator server 550 via a bidirectional communication interface 546 of the telecommunications network operator server 550 and a network 560, with the messages traversing a bidirectional communications interface 546 and controller I/O interface 538 at the telecommunications network operator server 550 in order to report data events to the network operator log 400. The telecommunications network operator server 550 may be, for example, a billing server, a SGSN or a GGSN. The telecommunications network operator server 550 has a controller 540, which includes a non-transitory computer-readable memory 542, one or more processors 544, and RAM 536. The one or more processors 544 may be configured by instructions stored in the memory 542 to convert the IP message log 400 into a peer-to-peer IP communication log 440 based on instructions stored in the memory 542. The memories 512 and 542 may comprise nonvolatile memory such as NVRAM, Read Only Memory (ROM), Flash memory, Electrically Erasable Read Only Memory (EEPROM), or magnetic media such as a hard drive. The processors 514 and 544 may comprise one or more microprocessors including a graphics or floating point processor.

Although individual operations of one or more methods are illustrated and described as separate operations, one or more of the individual operations may be performed concurrently, and nothing requires that the operations be performed in the order illustrated. Structures and components functionality presented as separate components in example configurations may be implemented as a combined structure or component. Similarly, structures and components functionality presented as a single component may be implemented as separate components. These and other variations, modifications, additions, and improvements fall within the scope of the subject matter herein.

As used herein, the term non-transitory computer-readable storage medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for systems and methods according to the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the techniques disclosed herein without departing from the spirit and scope defined in the appended claims.

What is claimed:

1. A method to identify and classify peer-to-peer Internet Protocol (IP) communication over a telecommunications network comprising:
    obtaining, by one or more processors, a log containing records of IP communications exchanges between over-the-top applications associated with a plurality of users of the telecommunications network;
    identifying, by the one or more processors, IP addresses associated with the records in the log;
    converting, by the one or more processors, the identified IP addresses to peer public IP addresses for the records in the log;
    obtaining, by the one or more processors, a list of known mediator server IP addresses associated with Traversal Using Relays around Network Address Translation (TURN) servers;
    removing, by the one or more processors, a subset of the records that include any of the known mediator server IP addresses from the log to generate a peer-to-peer IP communication log; and
    grouping, by the one or more processors, the records in the peer-to-peer IP communication log by similar characteristics.

2. The method of claim 1, wherein the records of IP communications exchanges in the log are associated with one of the following types of IP communication exchanges: voice calls, video calls, multimedia messages, or text messages.

3. The method of claim 1, wherein the similar characteristics include a destination or origination country of the IP addresses in the communications exchanges.

4. The method of claim 1, wherein the similar characteristics include a type of application used for the IP communications exchanges.

5. The method of claim 1, wherein the similar characteristics include counts of messages transmitted as part of the IP communications exchanges.

6. The method of claim 1, wherein the similar characteristics include duration of voice or video call as part of the IP communications exchange.

7. The method of claim 1, wherein converting the identified IP addresses to peer public IP addresses includes converting IPv6 addresses to IPv4 addresses.

8. A non-transitory computer-readable storage medium storing executable instructions that, when executed by a processor, cause the processor to:
    obtain a log containing records of IP communications exchanges between over-the-top applications associated with a plurality of users of a telecommunications network;
    identify IP addresses associated with the records in the log;
    convert the identified IP addresses to peer public IP addresses for the records in the log;
    obtain a list of known mediator server IP addresses associated with Traversal Using Relays around Network Address Translation (TURN) servers;
    remove a subset of the records that include any of the known mediator server IP addresses from the log to generate a peer-to-peer IP communication log; and
    group the records in the peer-to-peer IP communication log by similar characteristics.

9. The non-transitory computer-readable storage medium of claim 8, wherein the records of IP communications exchanges in the log are associated with one of the following types of IP communication exchanges: voice calls, video calls, multimedia messages, or text messages.

10. The non-transitory computer-readable storage medium of claim 8, wherein the similar characteristics include a destination or origination country of the IP addresses in the IP communications exchanges.

11. The non-transitory computer-readable storage medium of claim 8, wherein the similar characteristics include a type of application used for the IP communications exchanges.

12. The non-transitory computer-readable storage medium of claim 8, wherein the similar characteristics include counts of messages transmitted as part of the IP communications exchanges.

13. The non-transitory computer-readable storage medium of claim 8, wherein the similar characteristics include duration of voice or video call as part of the IP communications exchange.

14. The non-transitory computer-readable storage medium of claim 8, wherein converting the identified destination or origination IP addresses to peer public IP addresses includes converting IPv6 addresses to IPv4 addresses.

15. A system to identify and classify peer-to-peer Internet Protocol (IP) communication over a telecommunications network the system comprising:
    a wireless data communication interface communicatively coupled to a telecommunication network and configured for bidirectional communication using an internet protocol;
    one or more non-transitory computer-readable storage medium configured to store processor-executable instructions; and
    one or more processors operatively connected to the wireless data communication interface and the one or more non-transitory computer-readable storage medium, the one or more processors configured to execute the processor-executable instructions to cause the system to:
- obtain a log containing records of IP communications exchanges between over-the-top applications associated with a plurality of users of the telecommunications network;
- identify destination or origination IP addresses associated with the records in the log;
- convert the identified IP addresses to peer public IP addresses for the records in the log;
- obtain a list of known mediator server IP addresses associated with Traversal Using Relays around Network Address Translation (TURN) servers;
- remove a subset of the records that include any of the known mediator server IP addresses from the log to generate a peer-to-peer IP communication log; and
- group the records in the peer-to-peer IP communication log by similar characteristics.

16. The system of claim 15, wherein the records of IP communications exchanges in the log are associated with one of the following types of IP communication exchanges: voice calls, video calls, multimedia messages, or text messages.

17. The system of claim 15, wherein the similar characteristics include a destination or origination country of the IP communications exchanges.

18. The system of claim 15, wherein the similar characteristics include a type of application used for the IP communications exchanges.

19. The system of claim 15, wherein the similar characteristics include counts of messages transmitted as part of the IP communications exchanges.

20. The system of claim 15, wherein the similar characteristics include duration of voice or video call as part of the IP communications exchange.

* * * * *